US006996210B2

(12) United States Patent
Esty et al.

(10) Patent No.: US 6,996,210 B2
(45) Date of Patent: Feb. 7, 2006

(54) SYSTEM OF OPERATING A TELECOMMUNICATIONS CONTRACTING COMPANY

(76) Inventors: Michael Wayne Esty, 3011 River Forest Dr., Richmond, TX (US) 77469; Douglas Thomas Michel, 3043 Pecan Point Dr., Sugarland, TX (US) 77478

( * ) Notice: Subject to any disclaimer, the term of this patent is extended or adjusted under 35 U.S.C. 154(b) by 0 days.

(21) Appl. No.: 10/933,782

(22) Filed: Sep. 3, 2004

(65) Prior Publication Data

US 2005/0055261 A1 Mar. 10, 2005

Related U.S. Application Data

(60) Provisional application No. 60/500,220, filed on Sep. 4, 2003.

(51) Int. Cl.
*H04M 1/24* (2006.01)

(52) U.S. Cl. .................. 379/9.02; 379/9.03; 379/9.04; 379/29.09

(58) Field of Classification Search .................... 379/9, 379/9.01, 9.02, 9.03, 9.04, 10.01, 10.02, 379/10.03, 21, 29.09, 29.1; 705/7-11; 707/1
See application file for complete search history.

(56) References Cited

U.S. PATENT DOCUMENTS

| | | | | |
|---|---|---|---|---|
| 2004/0085561 | A1 * | 5/2004 | Fromherz | 358/1.13 |
| 2004/0158568 | A1 * | 8/2004 | Colle et al. | 707/100 |
| 2004/0225391 | A1 * | 11/2004 | Fromherz et al. | 700/97 |
| 2004/0260668 | A1 * | 12/2004 | Bradford et al. | 707/1 |
| 2004/0267595 | A1 * | 12/2004 | Woodings et al. | 705/9 |
| 2005/0137925 | A1 * | 6/2005 | Lakritz et al. | 705/8 |

* cited by examiner

*Primary Examiner*—Rexford Barnie
(74) *Attorney, Agent, or Firm*—Buskop Law Group, P.C.; Wendy Buskop

(57) ABSTRACT

Systems of operating a telecommunications contracting company are described herein. The systems generally includes introducing a business structure to the telecommunications contracting company, introducing field operations to the telecommunications contracting company, introducing office administration to the telecommunications contracting company, introducing customer service to the telecommunications contracting company, introducing a centralized management structure comprising: research and development, setting standards, and measuring results in relation to the standards set and requiring implementation of the introduced concepts for the company.

18 Claims, 1 Drawing Sheet

SYSTEM OF OPERATING A TELECOMMUNICATIONS CONTRACTING COMPANY

BACKGROUND

The present application claims priority to U.S. Provisional Patent Application Ser. No. 60/500,220 filed on Sep. 04, 2003.

Managing companies that install cable television, satellite communication distribution, and telephone and internet service has traditionally been haphazardly run.

FIELD

The present embodiments relate to systems for operating telecommunications contracting companies, such as DSL broad band companies, telephone service providers, cable television providers and satellite television providers.

A need has long existed for a system for managing these types of companies and more importantly for evaluation, assessing, tracking and following up on the labor based tasks of the technicians used in the field.

Most of the existing telecom companies have no documented system of managing and controlling the technicians. A frequent complaint is that technicians do not show up in a precise window of time to perform the installation, and that there is no form of quality control on the actions of these technicians.

The present invention was designed to overcome these problems and provide a fair and easily implemented and quick method for assessing technicians, assigning tasks, establishing routes and following up.

The present embodiments meet these needs.

BRIEF DESCRIPTION OF THE DRAWINGS

The detailed description will be better understood in conjunction with the accompanying following drawings.

Figure 1:
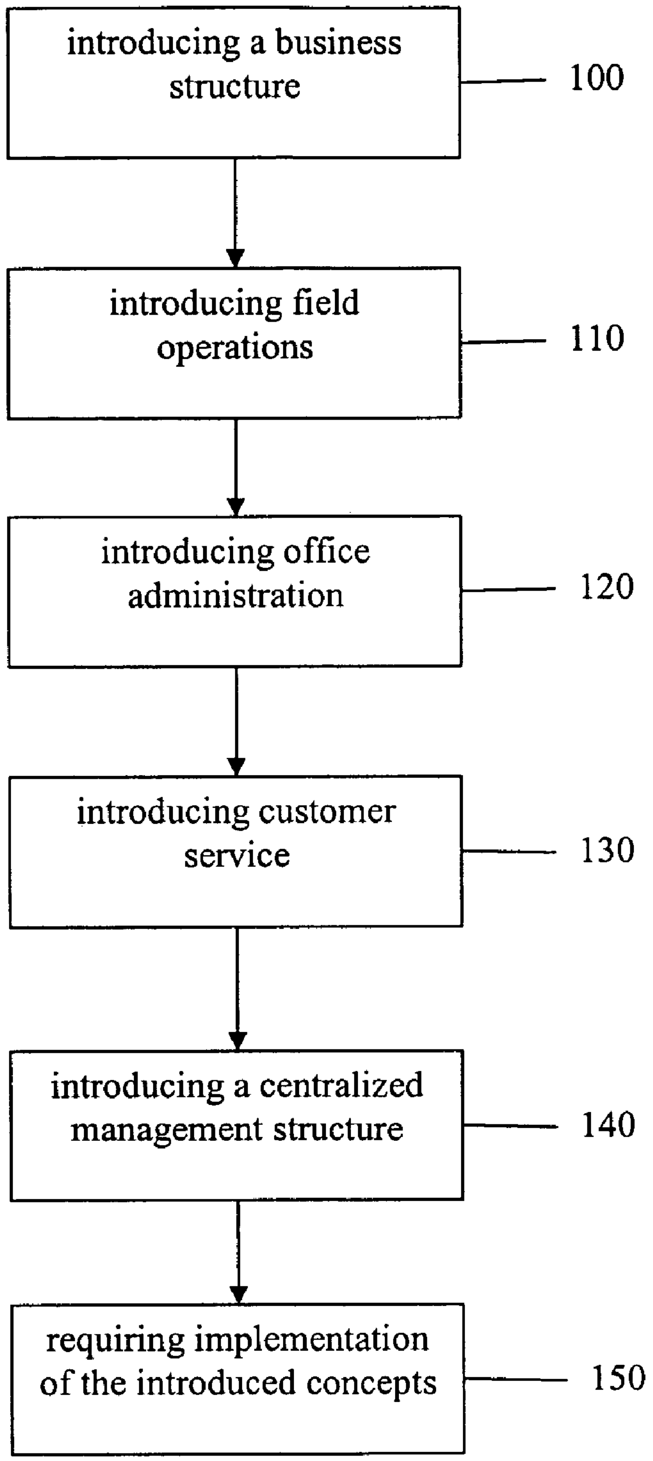
FIG. 1 is a schematic of an embodiment of the method to utilize the embodied system for operating a telecommunications contracting company at a facility.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments and that it can be practiced or carried out in various ways.

The present embodiments generally include a system to operate a telecommunications contracting company. For example, the telecommunications contracting company can include a high speed broadband or DSL internet service provider, a satellite television company, a telephone service provider, or a cable television company.

With reference to the figure, FIG. 1 depicts a schematic of an embodiment of a method to utilize the embodied system. The method generally includes introducing a business structure to the telecommunications contracting company (Step 100). In one embodiment, this step includes setting policies, and developing procedures to implement the set policies. Setting policies can include setting a policy relative to verifying an technician job log daily, setting a policy of trading jobs only with approval of dispatch, setting a policy of calling relative to an technician's availability to work, setting a policy that the technician job log is cleared on a daily basis and setting a policy that all tools, equipment and materials are tracked. In one embodiment, the policy for tracking equipment is with equipment logs and equipment status. The equipment status can include any one of the following, such as special handling, unknown location, unknown origin, controlled, field return or clear. The policy for tracking tools can be by dollar value of the tools. Alternatively, the policy for tracking tools can be by dollar value of the materials.

The business has two key components: the field office and the corporate office for a telecommunications contracting company that contracts with a Time Warner™ or a Clear Channel™ type of company for internet services, voice over IP phone services and radio and television. The system can be utilizes with any business that supplies seamlessly service to end users of the Time Warner, or Roadrunner™ or Clear Channel™ service. The unique business is organized to use one or more field offices and a centralized facility with an attached or remote centralized warehouse facility that is linked to the field offices and the centralized facility.

The business method uses formal corporate management structure for the facility with officers, account managers, and support staff. The centralized management structure has:

a. centralized research and development;
b. centralized human resources;
c. centralized accounting;
d. centralized material and tool tracking;
e. centralized information technology;
f. centralized standards and measurements for work performed, employee performance, and field technician performance;
g. facility policies for the operation of the facility;
h. facility procedures for the operation of the facility;
i. a formal field structure for the field operations with field technicians, field operations manager and support staff;
j. field policies for the operation of the field office operations; and
k. field procedures for the operation of the field office operations.

Importantly, the business structure is designed uniquely for the telecommunications industry to have standardized customer service for both field office facilities and the centralized office administration.

In the most preferred embodiment, the standardized customer service has standardized customer service training for field office employees, centralized office employees, and field technicians and standardized quality control standards for work handled by field office employees, centralized office employees and field technicians performing customer service.

The unique, incredibly efficient, embodied business model handles end user requests and material tracking faster better than other known models. The system utilizes a field office operation that includes:

a. field safety procedures;
b. field technician morale and team building procedures;
c. field standards for compliance;
d. field technician responsibilities;
e. field office employee responsibilities;
f. field technician management procedures for an operations manager or field leader;
g. field technician training;
h. distribution procedures for tools, equipment and material in the field;

i. posting procedures for field reports, field evaluations and field technician rankings;
j. work order field office handling procedures;
k. procedures for handling supervisor referrals;
l. procedures for scheduling work loads and adjusting work loads;
m. a standardized procedure for handling end user as well as customer relations;
n. a standardized procedure for handling technician recruiting; and
o. field office event administration.

The business model provides centralized office administration at the facility that includes:

a. standardized clerical support roles at the facility;
b. centralized office employee administration procedures at the facility;
c. employee in processing for field office and centralized office employees;
d. employee out processing for field office and centralized office employees;
e. scheduling of employees at the facility;
f. payroll support of employees for field office, field technicians, and centralized office employees;
g. employee evaluation process for field office and centralized office employees; and
h. centralized office event administration.

The business model provides a centralized warehousing of equipment, tools, and materials.

In another embodiment, the field technician management procedures can further include rules for daily verification of each field technician's job log; rules for trading of jobs only with the approval of a dispatcher; requirements for calling each field technician to confirm availability to work; rules on clearing the field technician's job log on a daily basis; rules for tracking tools, equipment and materials needed by each field technician.

The rules for tracking tools, equipment and materials for each field technician can require the field technician to use equipment logs and equipment status reports. The equipment status reports include an indication of at least a special handling status; location status as known or unknown; origin status as known or unknown; controlled status which indicates the equipment is in control of the telecommunications company rather than a field technician; field return status that indicates the equipment is in control of a field technician until the location of the equipment is verified by the telecommunications company, or a clear status indicates the equipment is no longer the responsibility of the telecommunications company.

The field technician management procedures further includes reviewing employee responsibilities with individual technicians, managing individual work orders; adjusting work load for individual field technicians; providing additional field technician support to a specific work order; and monitoring and training for technician safety in view of field safety procedures.

The technician recruiting involves qualifying and contracting field technicians.

The in-processing for field technicians typically comprises involves the creation of field technician accounts.

The payroll support of field technicians further comprises field technician account maintenance and field technician compensation support.

The work order field office handling procedures include collecting work orders; collecting money from field technicians; generating billing codes; verifying the billing codes, and performing quality control on work orders by verifying a customer order to completed work by the field technician.

The centralized warehousing further involves monitoring equipment logs for overdue equipment; and investigating equipment which is overdue based on the equipment logs.

Additionally, a dispatch function can be additionally implemented in the field office operation and in communication with the centralized office administration at the facility which coordinates with end user of the telecommunication service for work to be done by a field technician; tracking work orders; tracking field technicians assigned to work orders; and coordinating with the customer concerning the end users, the equipment and the work order. Coordinating with the end user can further consist of calling the end user and responding to calls from the end user.

Preferably, the end user is the client's customer, that is, the end user is the person whom contracts with the Time Warner™, Roadrunner™ or similar service.

The standardized customer service usable in this model can include damage handling and resolution; notification of claims or potential claims; and performing a survey of end users; and combinations thereof.

The field technician training can include equipment training; steps on how to perform the work; equipment upgrade training; end user interaction; and company policy training.

The customers can be a high speed broadband internet service provider, a DSL internet service provider, a satellite television company, a telephone service provider, and a cable television company as the term is used herein.

The method further has warehouse policies and procedure, such as functions of receiving; re-packaging; stocking; return equipment, tools and materials function; distributing of equipment, tools and materials function; collecting of equipment, tools and materials from field technician function; and auditing to verify that computer entries at the warehouse and actual items match.

The field office is the core of the Company. In every city in which the Company operates, one or more field offices will exist. The two types field offices are the central field office and the satellite field office. Only one central field office should be in a given city or market. Additional field offices are known as satellite field offices. The number of field offices will be dictated by the quantity and location of work.

The corporate office provides centralized control and support. The corporate office acts as the headquarters for the Company and should be the only corporate office.

The Company is divided into several different business areas that have specific responsibilities and support one another. Each of the business area can have positions allocated to them. The number and types of positions depend on the specific requirements of the field or corporate office.

The central field office is the main center of operations for the Company in a given city or market. The central field office will be located at a facility and house the business areas essential to field operations. The facility is usually leased by the Company.

The business areas of the central field office include: field operations, office administration, customer service, dispatch, training and recruiting, quality control, warehouse, and facility and infrastructure.

The central field office contains a main warehouse. The main warehouse supports one or more field warehouses.

The central field office can include a field operations center. The field operations center consists of the field warehouse, the field collection and distribution center, and a technician area.

The satellite field office consists only of a field operations center. As stated previously, the field operations center consists of a field warehouse, field collection and distribution center, and a technician area. The satellite field office can be supported by a central field office where functions such as dispatch and quality control are located. The facility used by the satellite field office is typically leased.

The corporate office is the headquarters for the Company. The management of the Company is part of the corporate office. The management is responsible for setting policies and for providing the tools and processes to the field offices in following those policies. Accounting, Human Resources, and Information Technology are business areas that are part of the corporate office. The corporate office can be co-located in the same facility with a central field office.

The Company can be divided into various business areas with specific responsibilities and contributions. Business areas are categorized by the office where they can be found.

The field office's primary responsibility is for daily operations. The following business areas can be found in the central field office. A satellite field office can contain elements of some of the business areas, such as Field Operations, Office Administration, and Warehouse. The other areas will be shared with the central field office.

The responsibilities of the field office can be categorized into eight major areas.

a. Field Operations. This area is the core of the business and is the technician's main interface. The other business areas support Field Operations.
b. Office Administration. This area is responsible for traditional office administration functions. The Office Administration staff may consist of an Office leader and one or more clerks working in an administrative role. The clerks support Field Operations and focus on the many paperwork and administrative aspects.
c. Customer Service. This area provides a centralized point of contact for dealing with the customer and with the customer's customer or subscriber. This area is responsible for seeing that the customer and subscriber are satisfied with the work performed and for handling any problem situations (such as damages) that may arise.
d. Dispatch. This area is actually a part of customer service, but is important enough that it is discussed separately. Dispatch interacts with the technicians in the field and manages the daily work. Dispatch also deals with the customer and subscribers by providing updates and information. The Dispatch area may not be present if the client performs the Dispatch function.
e. Warehouse. This area is responsible for procuring, managing, and distributing materials, tools, and equipment. The area can be divided between the main warehouse and the field warehouse(s).
f. Training and Recruiting. This area is responsible for the recruitment of new cable technicians and for overseeing technician and employee training. Technician training will normally be provided by a third party.
g. Quality Control. This area is responsible for maintaining a high degree of excellence in workmanship and customer service.
h. Facility and Infrastructure. This area is responsible for the upkeep and appearance of the office and other work spaces and equipment such as vehicles.

The corporate office's primary responsibility is to manage and support the field offices. The responsibilities of the corporate office can be categorized into four major areas.

a. Management. This area is responsible for running the business. Policies and procedures will be developed to support the field offices and execution of daily operations.
b. Human Resources. This area is responsible for personnel matters relating to employees and technicians. Human resource policies and procedures such as vacation accrual and sick leave are the responsibility of this area.
c. Accounting. This area is responsible for traditional accounting functions such as invoicing and accounts receivable. Policies and procedures dealing with finances and expenses will be developed by the leader who heads this area. The Accounting area deals with four main entities: vendors, subcontractors or technicians, employees, and the customer or client.
d. Information Technology. This area is responsible for all automation and information technology used by the Company. The Information Technology area will be responsible for developing policies and procedures relating to the use of computers, software, telephone systems and the office network. This area is also responsible for the software systems used the Company.

Generally, the policy can be created to apply to individual technicians of the telecommunications contracting company.

Continuing with FIG. 1, the method includes introducing field operations to the telecommunications contracting company (Step 110). The field operations can include field management, employee management and/or client relations, for example.

The Field Operations area is responsible for the daily operations of the field office. Safety always comes first and it is the responsibility of the Operations Manager to implement and execute the Safety Program. Morale and team-building, as well as standards compliance, is another responsibility of the Operations Manager and the field operations team.

A significant aspect of field operations and perhaps the Company are the technicians. The technicians are the resources that generate revenues for the Company. Support and management of the technicians is the responsibility of the Operations Manager and Field leader. Included in these responsibilities is the distribution and posting of pertinent and relevant information.

The work order is the means by which work is distributed and jobs are tracked. Work orders that require special attention and handling are designated as supervisor referrals.

Field management can include managing Technicians, work order management, adjusting work load, technician support, supervisor referrals, technician morale and team building, technician safety, compliance with standards, distribution and posting and combinations thereof.

Continuing with FIG. 1, the method includes introducing office administration to the telecommunications contracting company (Step 120). Introducing office administration to the telecommunications contracting company can include administration, such as clerical administration, employee administration, technician administration, work order administration, equipment administration and general administration.

Clerical administration can include accounting, material and tool tracking, standard office duties and printing and posting of reports.

Employee administration can include employee in processing, employee out processing, scheduling of employees, payroll processing support and employee evaluations.

Technician administration includes qualifying, contracting and creation of technician accounts, processing technicians, technician account maintenance, technician out processing and technician compensation support.

Work order administration can include collecting work orders from the field daily, collecting money from the field, assigning and verifying billing codes and quality control of work orders.

General administration can include organizing and implementing office events.

Equipment administration can include monitoring equipment logs for overdue equipment and investigation and following up on equipment which is overdue based on the equipment logs.

Continuing with FIG. 1, the method further includes introducing customer service to the telecommunications contracting company (Step 130). The customer service can include damage handling and resolution, notification of claims or potential claims or performing a survey of end users, for example.

The Customer Service area is responsible for all interaction with subscribers and with the client. Customer service is also responsible for Dispatch.

Customer Service is not only a business area, but it is also a core competency which permeates every part of the Company. Recognizing the importance of the client, the subscribers, and co-workers makes the Company responsive and capable. It starts with commitments to client standards and continues with timeliness, quality workmanship, and accuracy. It is ultimately people, not systems and technologies, who provide customer service.

Customer Service is synonymous with communication. Communicating with the client, subscribers, and team members is paramount to maintaining and building relationships. Completing a request is important, but communicating back to the originator regarding the request's completion is the target level of customer service for the Company. The final steps of completing and communicating back the request is termed as closure.

All damages are handled by the Customer Service area. Damages should be reported by the technician to their supervisor, Dispatch, or the Customer Service leader. Reality and experience have shown that most damages are not reported by the technician. Most technicians hope that damages will disappear or go unnoticed. Damages are typically reported by the subscriber to the client. The client passes the information to the Customer Service leader.

The customer service personnel are responsible for making contact with the damage claimant and for an investigation of the damage. The Customer Service area will rely on company staff to perform the actual investigation where the damage is documented, usually with video tape. Customer service will make a determination as to the claim's validity and to where the responsibility for the damage resides. Customer service can make arrangements for the damage to be repaired. Customer service is responsible for obtaining a damage release form from the claimant to close the matter as resolved. Customer service will track unresolved damages and resolve Continuing with FIG. 1, the method includes introducing a centralized management structure to the telecommunications contracting company (Step 140). The centralized management structure can include research and development, setting standards, measuring results in relation to the standards set, and requiring implementation of the introduced concepts for the company, for example. In another embodiment, introducing a Centralized Management Structure can include introducing a human resources department, an accounting department, and an Information Technology department.

The employee management can include employee recruiting, employee responsibilities, employee morale and team building, employee safety and combinations thereof.

In an alternative embodiment, the method includes introducing dispatch to the telecommunication contracting company. The dispatch can include coordinating with the end user, tracking work orders, tracking technicians and coordinating with the client. In one embodiment, the end user is the client's customer. In another embodiment, the client is the company that the telecommunications contracting company is providing services for. In yet another embodiment, coordinating with the end user consists of calling the end user, responding to calls from the end user.

Dispatch is an area designed to liaison between the technician and the Company, between the client and the Company, and between the subscriber and the Company. While Dispatch is a non-income producing area, the function of tracking jobs and technicians, working with subscribers and the client, and assisting field personnel make this business area a key part of installation.

In another embodiment, the method includes introducing training to the telecommunication contracting company. For example, the training can include employee training, technician training, and combinations thereof.

The training area is responsible for conducting the training and recruiting function of the Company. The training area is headed by a leader and may include a training coordinator and some number of trainers. The training leader is responsible for recruiting and establishing and maintaining the technician training curriculum. Employee training will be the responsibility of the Operations leader or may be delegated to a qualified individual. The employee training may or may not be under the training leader's control. The training coordinator is responsible for the administrative aspects of running the training program. The technician training program consists of three main portions: classroom training, hands-on training, and in-the-field training. The trainers are the trainees' point of contact. The trainers are responsible for answering trainee questions during the classroom portion and for conducting the hands-on portion.

In yet another embodiment, the method includes documenting the implementation of the telecommunications contracting company and using that documentation to standardize telecommunication contracting company operations.

Continuing with FIG. 1, the method can include implementing warehouse policies and procedures (Step 150). For example, the warehouse policies and procedures can include materials, tools, equipment, receiving, packaging, stocking, returning, distributing, collecting and auditing.

The Warehouse area plays an important role in helping Field Operations run the field. The Warehouse staff is responsible for the procurement, maintenance, distribution, collection, and transfer of all materials, tools, and equipment.

In one embodiment, the Warehouse staff typically consists of a leader and one or more warehousemen. The Warehouse leader may have additional responsibilities in other areas. The leader is responsible for managing the warehousemen and the warehouse. The leader makes sure the responsibilities of the Warehouse area are fulfilled.

The Warehouse is divided into two parts, the main warehouse and the field warehouse(s). Each "satellite" or field office will have a field warehouse. There will also be a field warehouse at the facility where the main warehouse is located. Depending on the size of the facility and the volume of work, these two warehouses may or may not be physically separated. The physical layout of the warehouse areas within the facility is discussed in the section on Facility and Infrastructure. The detailed layout is important in having the Warehouse area operate as efficiently as possible.

The purpose of distinguishing between the main warehouse and the field warehouses is to separate the warehouse functions that interact with the client and vendors from the warehouse functions that support the technician in the field. When the Company has a large volume of work, the main warehouse may support multiple field warehouses.

Both warehouses, main and field, involve the handling of materials, tools, and equipments. Both warehouses have common duties in ordering, receiving, distributing, collecting, restocking, and transferring these items. The main warehouse has additional duties such as packaging items. The main warehouse interacts with technicians only during loading, unloading, and emergency situations. The field warehouse interacts with technicians on a routine or daily basis.

While these embodiments have been described with emphasis on the preferred embodiments, it should be understood that within the scope of the appended claims, the embodiments might be practiced other than as specifically described herein.

What is claimed is:

1. A system of operating a telecommunications contracting company for a customer comprising using a facility with field offices, wherein the system comprises:

a. a business structure that integrates the facility and field office operations, wherein the business structure comprises:
   i. a formal corporate management structure for the facility comprising officers, account managers, and support staff; wherein the management structure further comprises:
      1. centralized research and development;
      2. centralized human resources;
      3. centralized accounting;
      4. centralized material and tool tracking;
      5. centralized information technology;
      6. centralized standards and measurements for work performed, employee performance, and field technician performance;
      7. facility policies for the operation of the facility;
      8. facility procedures for the operation of the facility;
      9. a formal field structure for the field operations with field technicians, field operations manager and support staff;
      10. field policies for the operation of the field office operations;
      11. field procedures for the operation of the field office operations; and
      12. standardized customer service for both field office facilities and the centralized office administration, wherein the standardized customer service comprises:
         (a). standardized customer service training for field office employees, centralized office employees, and field technicians; and
         (b). standardized quality control standards for work handled by field office employees, centralized office employees and field technicians performing customer service;

b. field office operations comprising:
   i. field safety procedures;
   ii. field technician morale and team building procedures;
   iii. field standards for compliance;
   iv. field technician responsibilities;
   v. field office employee responsibilities;
   vi. field technician management procedures for an operations manager or field leader;
   vii. field technician training;
   viii. distribution procedures for tools, equipment and material in the field;
   ix. posting procedures for field reports, field evaluations and field technician rankings;
   x. work order field office handling procedures;
   xi. procedures for handling supervisor referrals;
   xii. procedures for scheduling work loads and adjusting work loads;
   xiii. a standardized handling customer relations procedure;
   xiv. a standardized handling technician recruiting procedure; and
   xv. field office event administration;

c. centralized office administration at the facility comprising:
   i. standardized clerical support roles at the facility;
   ii. centralized office employee administration procedures at the facility;
   iii. employee in-processing for field office and centralized office employees;
   iv. employee out-processing for field office and centralized office employees;
   v. scheduling of employees at the facility;
   vi. payroll support of employees for field office, field technicians, and centralized office employees;
   vii. employee evaluation process for field office and centralized office employees; and
   viii. centralized office event administration; and d. centralized warehouse of equipment, tools, and materials.

2. The system of claim 1, wherein the field technician management procedures comprise:

a. rules for daily verification of each field technician's job log;
b. rules for trading of jobs only with the approval of a dispatcher;
c. requirements for calling each field technician to confirm availability to work;
d. rules on clearing the field technician's job log on a daily basis; and
e. rules for tracking tools, equipment and materials needed by each field technician.

3. The system of claim 2, wherein the rules for tracking tools, equipment and materials for each field technician utilize equipment logs and equipment status reports.

4. The system of claim 3, wherein the equipment status reports is a member selected from the group consisting of:

a. a special handling status;
b. a known location status;
c. an unknown location status;
d. origin status as known or unknown;
e. a controlled status that indicates the equipment is in control of the telecommunications company rather than a field technician;
f. a field return status that indicates the equipment is in control of a field technician until the location of the equipment is verified by the telecommunications company; and g. a clear status indicates the equipment is no longer the responsibility of the telecommunications company.

5. The system of claim 1, wherein the field technician management procedures further comprise a. an employee responsibilities review with individual technicians;

b. management of individual work orders;

c. plan for adjusting work load for individual field technicians;

d. additional field technician support to a specific work order;

e. a technician safety review in view of field safety procedures; and f. technician safety training for technician safety in view of field safety procedures.

6. The system of claim 1, wherein standardized handling technician recruiting procedure comprises qualifying and contracting field technicians.

7. The system of claim 1, wherein the employee in-processing comprises creation of field technician accounts.

8. The system of claim 1, wherein the payroll support of field technicians comprises field technician account maintenance and field technician compensation support.

9. The system of claim 1, wherein work order field office handling procedures comprises:

a. a work orders collection;

b. a money collection from field technicians;

c. a plan for generating billing codes;

d. a plan for verifying the billing codes, and e. quality control on work orders by verifying a customer order to completed work by the field technician.

10. The system of claim 1 , wherein the centralized warehouse comprises:

a. equipment logs review for overdue equipment; and b. overdue equipment investigation based on the equipment logs.

11. The system of claim 1, further comprising a dispatch function in the field office operation in communication with the centralized office administration at the facility comprising, wherein the dispatch function comprises:

a. coordination with end user of the telecommunication service for work to be done by a field technician;

b. a plan to track work orders;

c. a plan to track field technicians assigned to work orders; and d. coordination with the customer concerning the end users, the equipment and the work order.

12. The system of claim 11, wherein the end user is the client's customer.

13. The system of claim 11, wherein the coordination with the end user comprises a call to the end user and a response from the end user based on the call.

14. The system of claim 1, wherein standardized customer service comprises:

a. damage handling and resolution;

b. notification of claims or potential claims;

c. a survey of end users; and d. combinations thereof.

15. The system of claim 1, wherein the field technician training comprises:

a. equipment training;

b. steps on how to perform the work;

c. equipment upgrade training;

d. end user interaction; and e. company policy training.

16. The system of claim 1, wherein the customer is selected from the group consisting of a high speed broadband internet service provider, a DSL internet service provider, a satellite television company, a telephone service provider, and a cable television company.

17. The system of claim 1, further comprising warehouse policies and procedures.

18. The system of claim 1, wherein the centralized warehousing comprises:

a. a receiving function;

b. a re-packaging function;

c. a stocking function;

d. a return equipment, tools and materials function;

e. a distribution of equipment, tools and materials function;

f. a collections of equipment, tools and materials from field technician function; and g. an audit to verify that computer entries at the warehouse and actual items match.

* * * * *